(12) United States Patent
Choi (10) Patent No.: US 7,450,038 B2
(45) Date of Patent: Nov. 11, 2008

(54) DETERMINING OVERSAMPLED DATA TO BE INCLUDED IN UNIT INTERVALS

(75) Inventor: Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 19 days.

(21) Appl. No.: 11/592,792

(22) Filed: Nov. 3, 2006

(65) Prior Publication Data

US 2008/0123780 A1    May 29, 2008

(51) Int. Cl.
*H03M 9/00* (2006.01)
*H04L 7/00* (2006.01)

(52) U.S. Cl. .................. 341/100; 375/355; 370/506

(58) Field of Classification Search ............... 341/100, 341/101; 375/340, 355
See application file for complete search history.

(56) References Cited

U.S. PATENT DOCUMENTS

| 6,606,360 | B1* | 8/2003 | Dunning et al. ............. 375/354 |
|---|---|---|---|
| 6,897,793 | B1 | 5/2005 | Kim et al. |
| 6,907,096 | B1* | 6/2005 | Lueker et al. ............... 375/355 |
| 7,149,269 | B2* | 12/2006 | Cranford et al. ............ 375/373 |
| 7,236,553 | B1 | 6/2007 | Choi |
| 2004/0022196 | A1* | 2/2004 | Rivoir ......................... 370/241 |
| 2006/0222129 | A1* | 10/2006 | Hadzic et al. ............... 375/355 |
| 2007/0280392 | A1* | 12/2007 | De Laurentiis et al. ...... 375/355 |

OTHER PUBLICATIONS

Choi et al.—U.S. Appl. No. 10/763,905 filed Jan. 23, 2004—Reduced Dead-Cycle, Adaptive Phase Tracking Method and Apparatus.
"U.S. Appl. No. 11/856,640 Filed Sep. 17, 2008", Whole Document.

* cited by examiner

*Primary Examiner*—Howard Williams
(74) *Attorney, Agent, or Firm*—Blakely Sokoloff Taylor & Zafman (57) ABSTRACT

In some embodiments, a chip includes sampling circuitry to produce oversampled data from a received signal, and logic to determine which of the oversampled data are to be part of different unit intervals, wherein some of the unit intervals have a number of oversampled data that is different than a number of oversampled data typically included in the unit intervals. Other embodiments are described and claimed.

27 Claims, 6 Drawing Sheets

6'b000001, 6'b111110,
6'b000011, 6'b111100: begin cur_ptramt = 6; nxt_rm = cur_rm + 1; end
6'bx10000, 6'bx01111: begin cur_ptramt = 4; nxt_rm = cur_rm - 1; end
6'bx00111, 6'bx11000: if (cur_rm[0]) begin
                cur_ptramt = 3; nxt_rm = cur+rm + 3;
                no_out = 1'b1;
            end else if (cur_rm ! = 0) ...

```
Assign flip09 = v9d            &&
                !v11           &&
                ocnt_s[13] != 11&&
                !sum[0]        &&
                  (pos_sum >=5 ||
                   pos_sum >=4 &&
                   pos_sum2 >=5 &&
                   !rm_s14[0] && !rm_s14_d[0] ||
                v9d            &&
                v9 && pos_sum >= 4;
```

DETERMINING OVERSAMPLED DATA TO BE INCLUDED IN UNIT INTERVALS

FIELD

Embodiments of the inventions relate generally to phase tracking techniques and, more particularly, to circuits, methods, and systems for determining which oversampled data are to be part of different groups of oversampled data (unit intervals) used in determining the values of bits of a received signal.

BACKGROUND

Phase tracking has an important role in the data recovery process of high-speed serial data receivers because it determines the right one among several over-sampled data. Various techniques for picking the sample have been proposed including tracking the edge movement of input stream and scoring samples based on how close they are to the center of the edges (that is, the center of the eye). However, these prior techniques have problems with fast and large jitter. One problem is that the loop latency existing in the path from the scoring logic to the actual change of picking position based on the score limits the speed at which the system can respond to jitter.

A second problem is that scoring of each picking position based on the edge information assumes each eye has the same number of oversampled data (OSD) (for example, 5 OSDs) and a group (or chunk) of OSDs (for example, 50 OSDs) have consistent information on the jitter. However, these assumptions may not be correct when the jitter is fast and/or large. In response to such jitter, some eyes are 6 OSDs wide, while other eyes may be 4 OSDs wide, or even more or less. In addition, an early OSD and a late OSD may involve different information on jitter in the channel.

Digital Video Interface (DVI) is a standard used in providing video signals between chips and is partially compatible for use with High Definition Multi-media Interface (HDMI) compatible products. DVI includes a specification on the eye characteristics that transmitters and receivers have to meet for interoperability. However, some of transmitters in the market do not follow the DVI specification and are DVI non-compliant transmitters. In such a case, phase trackers that expect signals from DVI compliant transmitter from time to time show poor results (e.g., a noisy screen) with signals from DVI non-compliant transmitters. In addition, some users want to use a spread-spectrum clock to reduce the electromagnetic interference (EMI) in such a way that the input stream becomes DVI non-compliant.

The DVI compliant input and DVI non-compliant input may have a difference in eye shape. Sometimes, DVI compliant signals are said to be "non-coherent" in that in the transmitter, the clock signal does not pass through a phase locked loop (PLL) that is used to create the data signals to be transmitted. Some DVI non-compliant transmitters have the clock signal pass through a PLL that is used to create the data signals to be transmitted. This is sometimes said to be "coherent" and adds an extra delay that sometimes leads to some closed eyes.

SUMMARY

In some embodiments, a chip includes sampling circuitry to produce oversampled data from a received signal and logic to determine which of the oversampled data are to be part of different unit intervals, wherein some of the unit intervals have a number of oversampled data that is different than a number of oversampled data typically included in the unit intervals. The logic may include stages in a pipeline wherein the oversampled data are arranged in lines that are advanced through the stages and wherein the logic concurrently evaluates different sections of the oversampled data in different lines.

In other embodiments, a method includes sampling a received signal to produce oversampled data and determining which of the oversampled data are to be part of different unit intervals, wherein some of the unit intervals have a number of oversampled data that is different than a number of oversampled data typically included in the unit intervals.

In yet other embodiments, a system includes conductors and a first chip including transmitters to transmit data to the conductors. The system further includes a second chip to receive the transmitted data from the conductors, the second chip having processing circuitry including sampling circuitry to produce oversampled data from a received signal. The second chip also includes logic to determine which of the oversampled data are to be part of different unit intervals, wherein some of the unit intervals have a number of oversampled data that is different than a number of oversampled data typically included in the unit intervals.

Other embodiments are described and claimed.

BRIEF DESCRIPTION OF THE DRAWINGS

The inventions may be understood by referring to the following description and accompanying drawings that are used to illustrate embodiments of the invention. However, the inventions are not limited to the details of these drawings.

DETAILED DESCRIPTION

In some embodiments, the inventions involve circuits, methods, and systems for determining which oversampled data (OSD) are to be part of a group (or chunk) of OSDs used for determining the value of bits of the received signal. These groups of OSDs are referred to herein as unit intervals (UIs). The OSDs in the (UIs) may be evaluated to determine, for example, whether they represent high or low voltages (1s or 0s). The OSDs may be assembled in lines and, in some embodiments, the lines are passed through a pipeline of stages.

For some determinations, the receiver evaluates two sections of the OSDs: one section is from a last group of OSDs in a line and the other section is from a first group of OSDs in the next line in time order. This second section is called the look ahead section or look ahead OSDs because they are later in time order. However, in some embodiments, for most determinations, OSDs from one line are evaluated and there is no look ahead to the next line. In some embodiments, there may be look ahead sections on the same line; in other embodiments, there may be look behind sections in the same line; and in still other embodiments, there may be look ahead and look behind sections. The first section may be called the typical section and it may include a number of OSDs equal to the number typically included in the UI. However, in some cases, fewer than a typical number of OSDs may be included in a UI and fewer than the typical number from a line. For example, in a 5× oversampling system, the UI typically includes 5 OSDs. In such a case, the typical section would include 5 OSDs.

Figure 1:
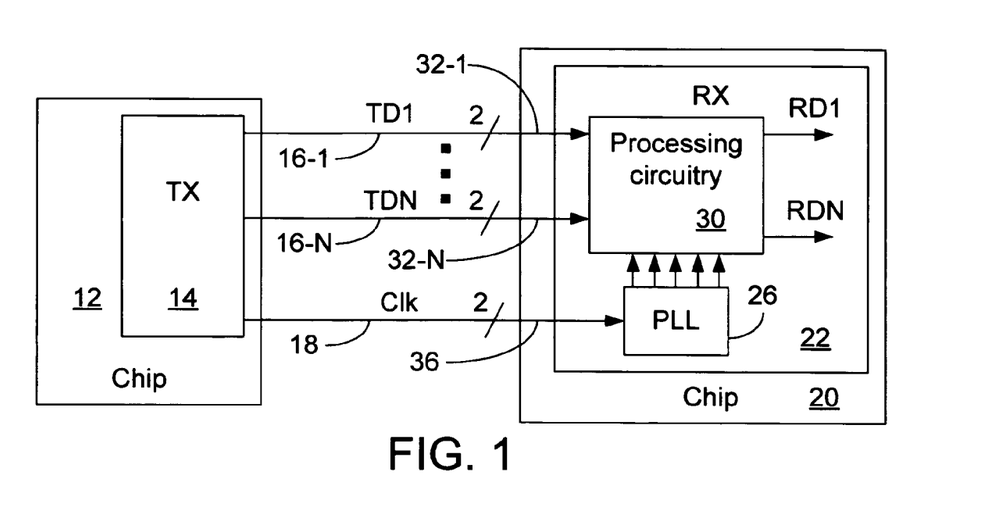
FIG. 1 is a block diagram representation of a system including a chip with a transmitter, conductors, and a chip with a receiver according to some embodiments of the inventions.

The inventions may be used in a variety of systems, of which FIG. 1 is an example. Referring to FIG. 1, a system includes a chip 12 with a transmitter (TX) 14 that transmits data signals TD1 ... TDN on conductors 16-1 ... 16-N and a clock signal on conductors 18 to receivers 22 in a chip 20. The signals may be transmitted differentially. Other signals (not shown) may also be transmitted. Receivers 22 includes processing circuitry 30 which receives OSDs from a sampling circuit clocked by a phase locked loop (PLL) 26 and provides output signals RD1 ... RDN. Chip 20 includes chip interface structures 32-1 ... 32-N to interface with conductors 16-1 ... 16-N and chip interface structures 36 to interface with conductors 18. In different implementations, the interface structures could include different objects.

Figure 2:
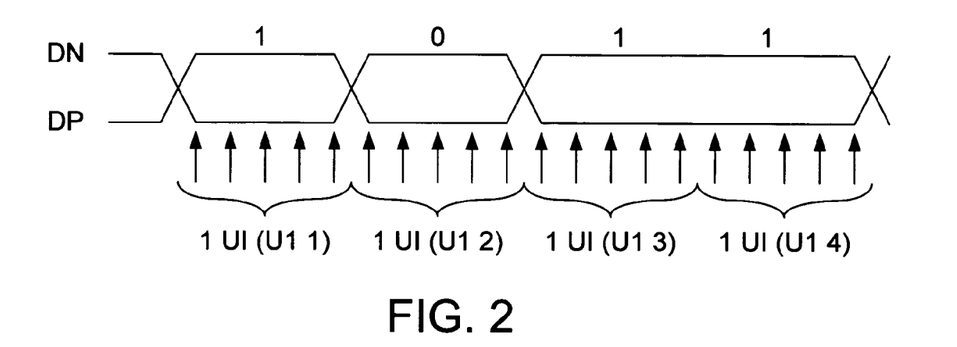
FIG. 2 is a graphical representation of oversampled data and unit intervals for an exemplary signal according to some embodiments of the inventions.

FIG. 2 illustrates an idealized example of incoming data TD1 that includes differential signals with DN (data negative) and DP (data positive) components. The UI is the time of one bit of data. In this example, when DP>DN, the signal represents a 1 and when DP<DN, the signal represents 0. In FIG. 2, four UIs are illustrated, called UI 1, UI 2, UI 3, and UI 4 for purposes of discussion. During UI 1, the data bit has a logic high value (which in this case represents a 1, but in other cases it represents a 0.) During UI 2, UI 3, and UI 4, the data bits have 0, 1, and 1 values, respectively. During each UI, there are five data samples clocked by the outputs of PLL 26 indicated by arrows in FIG. 2. The incoming signal during a UI is called an eye.

Although the UIs typically have, for example, 5 OSDs, because of jitter or other things, particular units intervals may have more or less than 5 OSDs. For example, a particular UI may have 4 or 6 OSDs or in some cases even 3 or 7 OSDs.

Figure 3:
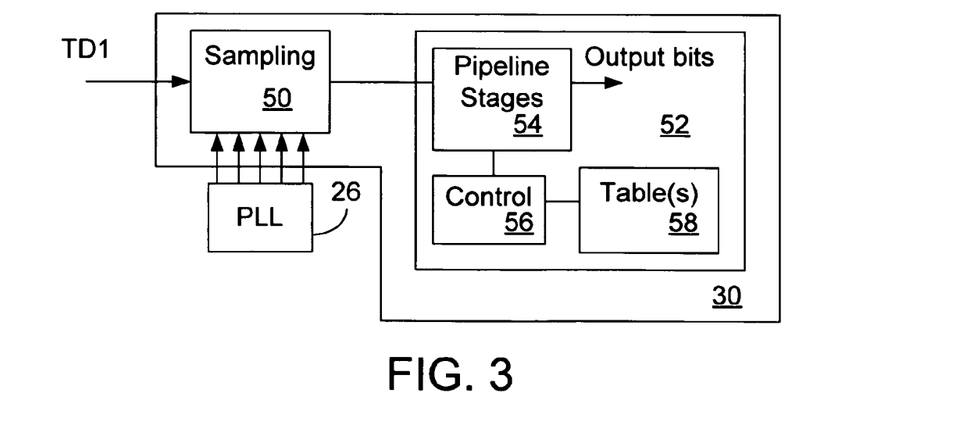
FIG. 3 is a block diagram representation of an example of the receiver of FIG. 1 according to some embodiments of the inventions.

FIG. 3 illustrates details of some embodiments of processing circuitry 30, although in other embodiments, the details may be different. Referring to FIG. 3, sampling circuitry 50 provides OSDs of the incoming signal TD1 in response to the output phase signals of PLL 26. As an example, PLL 26 may have five outputs (but could have a different number in other embodiments). Pipeline stages 54 of logic 52 receives the OSDs. Under the control of control circuitry 56, pipeline stages 54 determines which UIs particular OSDs are included in. In some embodiments, a table(s) 58 is used. In other embodiments, the function of table(s) 58 is hardwired into pipeline stages 54. The values in the table may be permanently stored in the tables or be reconfigurable.

Figure 4:
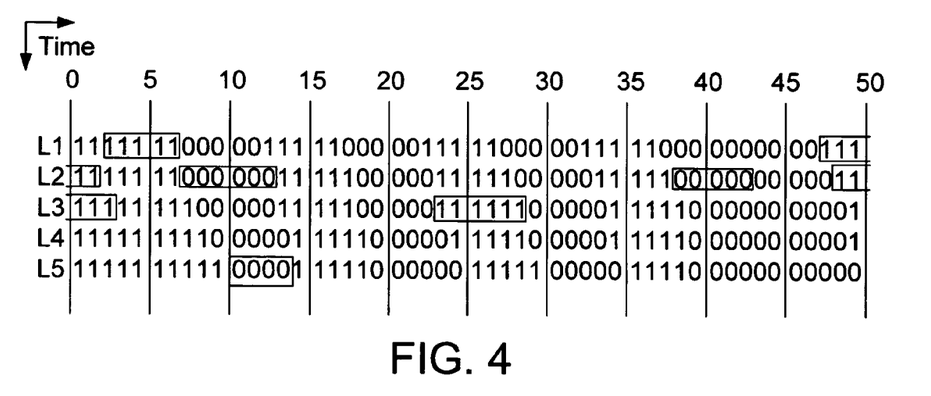
FIG. 4 is a graphical representation of lines of oversampled data according to some embodiments of the inventions.

FIG. 4 represents 1s and 0s in five lines (1, 2, 3, 4, and 5) of 50 OSDs each (OSDs 0-49). In time order, line 1 comes first, followed by line 2, line 3, etc. The following provides examples, but the inventions are not limited to these examples. Assume that the first two OSDs of line 1 are not part of a UI in line 1. OSDs 3-7 are five 1s, which are in a UI representing a bit 1. For convenience of identification, a box is put around OSDs 3-7 and around some other OSDs. OSDs 3-7 are followed by five 0s, five 1s, five 0s, five 1s, five 0s, five 1s, five 0s and five 0s in UIs (with five OSDs each) representing bits 0, 1, 0, 1, 0, 1, 0, and 0. Line 1 ends with three 1s. These concluding three 1s considered alone are inconclusive. However, if considered with the first five OSDs of line 2, it becomes clear that the last three 1s of line 1 and the first two is of line 2 are an OSD with five 1's. Then line 2 continues with five is, six 0s and five 1s. Since the six 0s are sandwiched between two sets of five 1s, they are interpreted to be a UI of six 0s, which represents a 0 bit. By continuing on with lines 2-5, it can be seen that there are some instances of UIs with other than 5 OSDs, for examples, OSDs 23-28 (six 1s) of line 3 and OSDs 10-13 (four 0s) of line 5.

However, to be practical, the sequential operation described in connection with FIG. 4 needs to handle more than only a small number (for example, 5 to 6 or so) of OSDs are a time. To accomplish this, a pipelined structure is used in which all or part of bits of a line are advanced from stage to stage of a pipeline. In some embodiments, a whole line (for example, 50 OSDs) can be handled in one pass through the pipeline. Even though this takes several clock cycles, since it is pipelined, after an initial latency, in some embodiments, a new line of OSDs can be completed with each clock cycle or almost all clock cycles.

There are various ways in which to implement the pipeline structure. In some embodiments, a line is initially evaluated to detect likely UIs of the OSDs of the line. The last typical section in the line is evaluated in combination with a look ahead section from the next line to determine the UI for these OSDs before the contents of other UIs are determined. The number of OSDs in a look ahead section is implementation specific, but it could be 5 OSDs.

Figure 5:
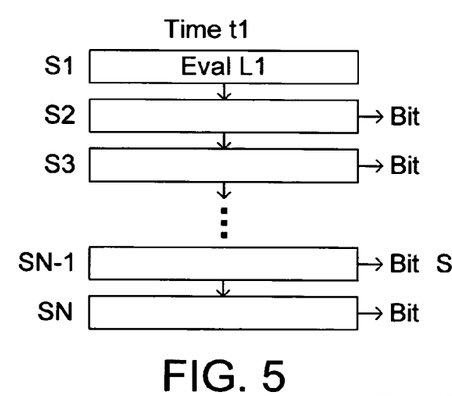
Figure 6:
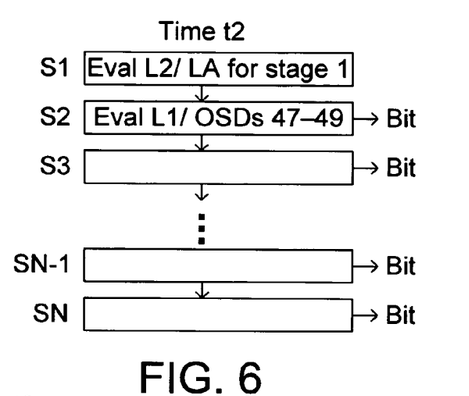
FIGS. 6-12 are each block diagram representations of stages of a pipeline according to some embodiments of the inventions.
Figure 7:
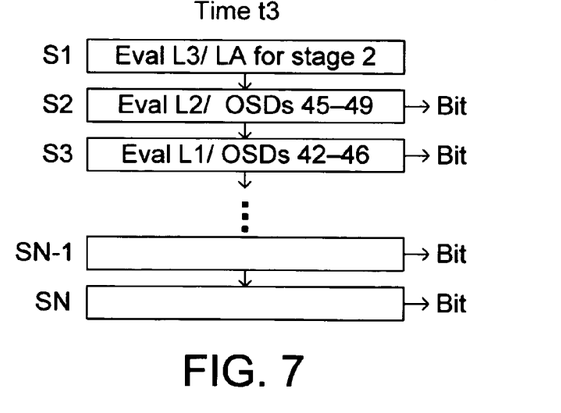

For example, FIGS. 5-7 illustrate pipeline stages S1-SN at times t1, t2, and t3. As shown in FIG. 5, at time t1, stage 1 has line 1 in it. The OSDs of line 1 are evaluated in the same fashion as in the discussion of FIG. 4 to determine that the last three OSDs (47-49) are not part of the same UI as other OSDs in line 1.

Referring to FIG. 6, line 1 from stage 1 is passed to stage 2 and line 2 is provided to stage 1. Line 1 is evaluated in stage 2 and line 2 is evaluated in stage 1. Further, stage 1 provides look ahead OSDs for evaluation in stage 2. Stage 2 determines that the last three OSDs of line 1 should be combined with the first two OSDs of line 2 to form a UI with a bit value of 1.

Referring to FIG. 7, line 1 from stage 2 is provided to stage 3. Since, the last OSDs of line 1 were assigned to a UI in stage 2, stage 3 evaluates OSDs only from line 1. In the implementation of FIG. 7, stage 3 determines that OSDs 42-46 of line 1 should be assigned to a UI. In some implementations, stage 3 begins with the typical section immediately preceding the OSDs that were assigned to a UI in the previous stage. Stage 3 may also look back at earlier OSDs to see if they are part of the same UI as the typical section. Further not all of the typical section need be part of the UI (for example, if there are only 3 or 4 OSDs in the UI). As mentioned, in some implementations, the groups of OSDs are determined before the second stage (with the exception of the look ahead bits). The stage identifies the OSDs for the UI and determines the value of the bit that the UI represents. In other implementations, stage 3 starts with first typical section in the line and works toward the end OSD (in this case, OSD 46, since OSDs 47-49 are already assigned). In stage 2, line 2 is evaluated like line 1 was in stage 2 in FIG. 6, and line 3 is evaluated like line 1 was in stage 1 in FIG. 5.

Under the implementation of FIGS. 5-7, only the second stage looks ahead to another line (which is the line in the first stage). In other implementations, a different stage(s) could be used in look ahead to a different line.

Figure 8:
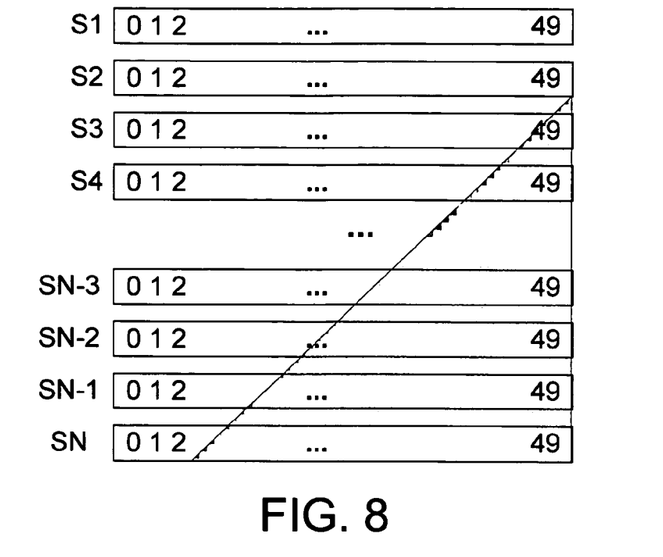

FIG. 8 illustrates that as the lines progress through some of the stages, the fewer and fewer OSDs of the lines are involved with processing in the stages. For example, the shaded part of FIG. 8 generally (but not precisely) illustrates OSDs that have already been processed. Since more than ten 50 OSDs are processed in the whole pipeline structure, after an initial latency, the pipeline can generate ten outputs (one from each of different groups of 50 OSDs) in one clock cycle and effectively process 50 OSD in one clock cycle—from ten different lines. Stated another way, the pipeline can process ten groups of 50 OSDs in ten clock cycles to produce ten bits. Note that as used herein, a clock cycle is not necessarily equal to the period of the clock. For example, in double data rate signaling, there are two "clock cycles" in a clock period.

In some embodiments, a stage sometimes does not produce a bit. For example, in addition to stage 1 (which in some embodiments does not produce a bit), there may be another stage in the pipeline that does not produce a bit for a particular line because of the particular combination of bits. In this case, there may be an extra stage, for example, twelve stages. Still the throughput may be ten bits per clock cycle, even though the latency is twelve cycles. However, some embodiments do not include these details. In some embodiments, it may take more than ten cycles to obtain ten bits from ten lines.

Figure 9:
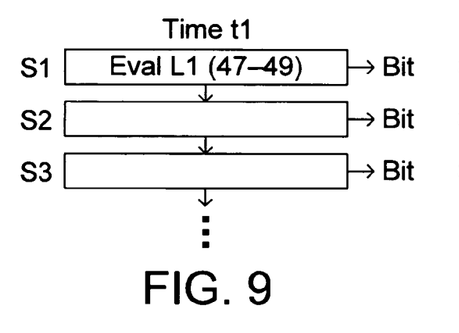
Figure 10:
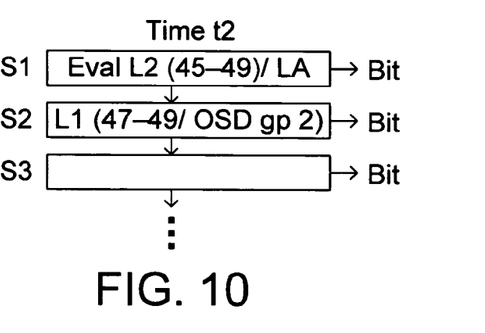
Figure 11:
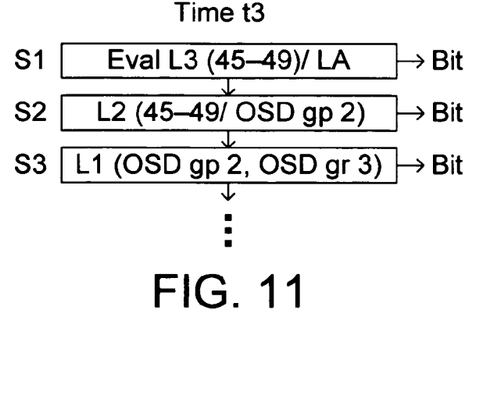

FIGS. 9-11 illustrate a process that is similar to that of FIGS. 5-7. However, in FIG. 9, stage 1 may determine that OSDs 45-49 are part of a UI that is complete in line 1. In that case, a bit is provided from stage 1 (whereas a bit was not provided from stage 1 regardless of the values of the OSDs in stage 1). In FIG. 10, stage 2 may evaluate OSDs 45-49 or the next group of OSDs if stage 1 determines OSDs 45-49 are part of a UI that does not bridge lines. In FIG. 11, stage 3 may evaluate either the second or third group of OSDs in line 1, and stage 2 may evaluate the first or second group of OSDs in line 2, and stage 1 determines whether the first group of OSDs in line 3 (OSDs 45-49).

Figure 12:
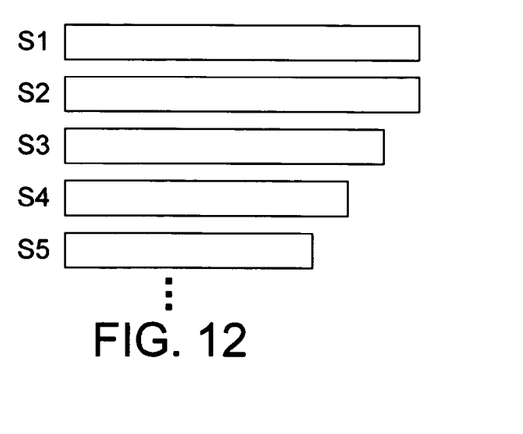

As mentioned, as the lines progress through the stages, certain OSDs are no longer considered. In that case, depending on the design, it may be a waste of circuitry to continue to hold these OSDs. Accordingly, FIG. 12 illustrates that the circuitry of stage 5 holds fewer OSDs than stage 4, which holds fewer OSDs than stage 3, which holds fewer OSDs than stage 2. This may reduce the number of registers and multiplexers used. Since the exact number of OSDs left to be evaluated in a line at a particular stage is unpredictable and varies from line to line, sometimes, there will be excessive capacity at a particular stage.

Figure 13:
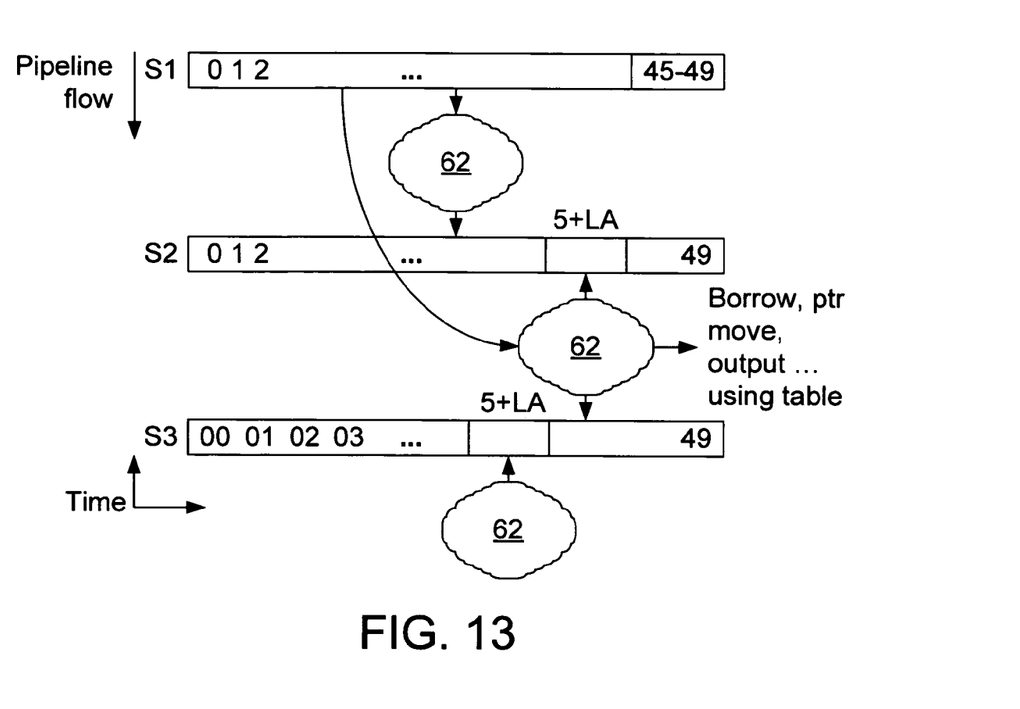
FIG. 13 is a block diagram representations of stages of a pipeline and associated processes according to some embodiments of the inventions.
Figure 14:
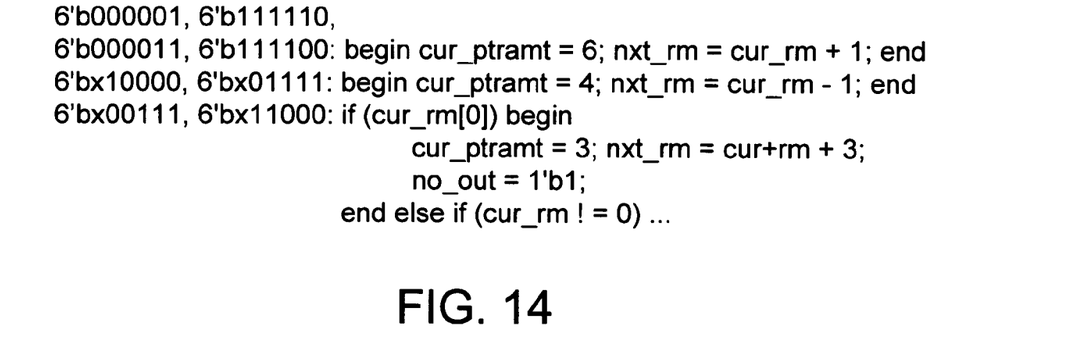
FIG. 14 is pseudo code that may be used in connection with some embodiments of the inventions.

FIG. 13 illustrates further details of some embodiments of stages 1, 2, and 3 for a line. Process 62 between stages 1 and 2, between stages 2 and 3, and with stage 3 are performed by logic 52 and table(s) 56 (in FIG. 3) as described in connection with the algorithm of FIG. 14. Note that in this embodiment, the group of OSDs of a line being evaluated moves away from OSD 49 toward OSD 0. The first OSD of a group of OSDs being evaluated is the current pointer amount. If the group is OSDs 42-46, then the current pointer amount is 46. It is relatively easy to determine the current pointer amount when the UI contains five 0s or five 1s, or four or six 0s or four or six 1s sandwiched between UIs will all 0s or 1s. The algorithm of FIG. 14 provides solutions more complicated cases which can be performed by logic 52 and table(s) 56. However, some embodiments do not follow the algorithm of FIG. 14 or follow a modified version of it.

Referring to FIG. 14, a current pointer indicates the first OSD of the groups of OSDs to evaluate. For example, in FIG. 5, stage 2, the current pointer is at position 49. In FIG. 6, stage 3, the current pointer is at position 46. A current pointer amount (cur_ptramt) indicates how much the current pointer is to move based on the contents of the recent group of OSDs. A remainder (rm) is how much above or below 5 OSDs the line is currently at. For example, if the line begins with groups of 5 OSDs and then has a group of 6 OSDs, then the current remainder is increased by one (nxt_rm=cur_rm+1). If the line then has a group of 4 OSDs, then the current remainder is decreased by one (nxt_rm=cur_rm−1).

Groups of OSDs 6'b00001, 6'b111110, 6'b000011, and 6'b111100 are four groups of 6 OSDs. In response to these, the current pointer amount is six so the current pointer moves six positions and the current remainder increases by one. Groups of OSDs 6'bx10000 and 6'bx01111 are two groups of OSDs, where x can represent either a 1 or a 0. In response to these, current pointer amount is four so the current pointer moves four positions and the current remainder decreases by one. If the UI has 5 OSDs, then the cur ptramt=5 and nxt_rm=cur_rm. Cur_rm[0] is the most significant bit (MSB) of the current value of rm and if it is 1 it means that less number of OSD has been used up to now (cur_rm is defined as [0:n] and MSB is 0 and it becomes 1 if cur_rm is a negative number). For example, in the case of three groups of 4 OSDs in a row (4 4 4), there is a one bit residue for each time—those three bits may be taken away since they are accumulated residue. However, the details are implementation specific.

No_out=1'b1 means no output in for a given group of OSD. As mentioned, for stages, there is a case where no output is generated from the given group of OSD. For example, as shown in FIG. 14, if we have used a less number of OSDs up to now, and there is a group of three OSDs (6'bx00111 and 6'bx11000 case), the algorithm may decide to discard those three OSDs since they are accumulated residues, not actual OSDs corresponding to a valid UI. That kind of residue may be generated because of jitters that change the width of UIs.

In stage X, the pipeline looks at unprocessed 6 OSDs (from curptr) and decides the output and the amount of curptr movement (e.g., 5 if 5 OSDs are used and 4 if 4 OSDs are used to make an output). If in the 6 OSDs there are less than 5 bits of consecutive same value (for example, 1000, 1100, etc) then the first part of stage X−1 is examined to see whether there is any possible borrowing of OSDs to make 5 consecutive bits. If there are, the bits are borrowed, the output bit is generated, and the curptr is moved accordingly. In addition, the stage X−1's available number of bits is reduced by the amount of borrowing. If there are not enough bits for borrowing, an output may or may not be made based on table(s) 56. Table(s) 56 may help decide the effective jitter tolerance. For example, in some case, an output is made from only 4 bits of consecutive OSDs instead of 5 because it is assumed that the jitter caused it. In such a case, it is noted that the UI had one less OSD in variable rm. Similarly, if a UI has 6 OSDs, then it is noted than an extra OSD was used. This rm is used to decide the output when there are 3 consecutive OSDs. This may be thought of as a redundant one, that is, several eyes become larger due to jitter and its effect was accumulated and as a result 3 OSDs remain. Or, it may be thought as valid ones, that is, 2 OSDs are removed due to jitter, thus a UI with 3 OSDs ought to be made. The value of rm indicates the jitter status from which the output of 3 OSDs can be decided. The borrowing amount, curptr move amount, rm value, and output may be determined based on predefined tables in table(s) 56.

Figure 15:
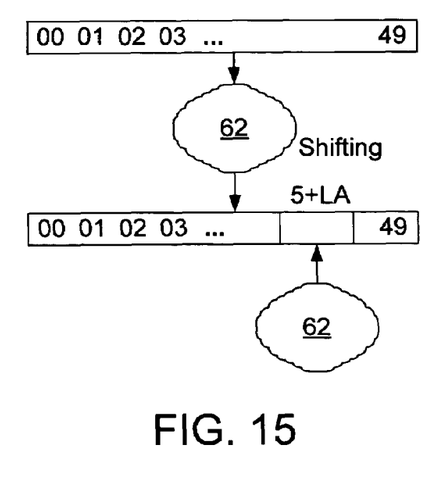
FIGS. 15-16 are each block diagram representations of stages of a pipeline and associated processes according to some embodiments of the inventions.
Figure 16:
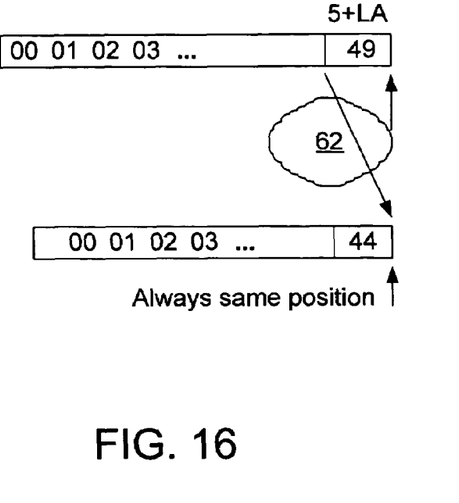

FIG. 15 and FIG. 16 contrast two different approaches. In FIG. 15, a line of data is moved from one stage to the next stage and the current pointer is moved. FIG. 15 has two shifters: one is to handle borrowed bits (remove them) and the other one to elicit 6 OSDs to be processed in the stages. That is, in some embodiments, it takes a look at the 6 OSDs and based on the pattern of them, it consumes 4, 5 or 6 OSDs in the stages. On the other hand, FIG. 16 has only one shifter that shifts the whole OSDs to right based on the processed amount so the current pointer is always in the same position. In this case, there is some extra logic to mark the borrowed OSDs in such a way that they are not used later to make an output. In FIG. 16, the lower stage is shown to be shorter than the upper stage because fewer registers are needed. There may be fewer multiplexers in the implementation of FIG. 16. FIG. 11 could be modified to be like FIG. 16.

Figure 17:
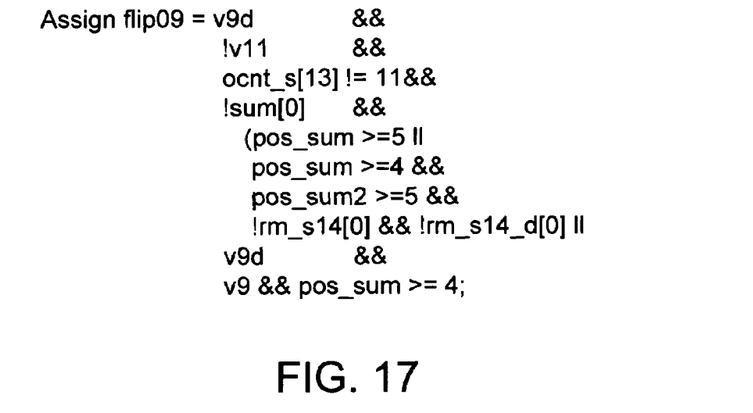
FIG. 17 is pseudo code that may be used in connection with some embodiments of the inventions.

Another algorithm that is used in some embodiments is referred to as "flip." It is related to the rm value explained in connection with FIG. 14. The rm represents the accumulated number of OSDs "over or under" used to make outputs. Thus, if it reaches 4 or 5 it means that 4/5 OSDs are over/under used to make outputs. Since 5(4) OSDs correspond to one output normally, in such a case, the output may be corrected by inserting or deleting one output. For example, the pseudo code segment of FIG. 17 shows a case to insert one output. In the code, pos_sum, pos_sum2, and rm_s14 are all related to the rm value. Some embodiments do not use the algorithm of FIG. 17 or use a variation of it.

50 OSDs sometimes contains 9 bits, sometimes 10 bits, and sometimes 11 bits, but the long term average is 10 bits in 50 OSDs. A book keeping technique may be used. If 50 OSDs contains 9 bit in previous couple of cycles, then it is more likely that the following OSD will include 11 bit instead of 10 bit to average to 10 bit. Similarly, the previous 50 OSDs contain 11 bits in the previous couple of cycles, then it is more likely that the next 50 OSDs will include 9 bits instead of 10 bits to average 10 bits.

In FIG. 17, flip 09 concerns the case of 9 bits contained in 50 OSDs. The following are explanations of symbols: v9 is a validated 9 bits case from 50 OSDs and v11 is a validated 11 bits from 50 OSDs; V9d is a delayed version of v9; !v11 means not v11; && is a logical AND; v9d—one less bit was generated in the previous cycle; !v11—no compensation at this time instance; ocnt_s[13] !=11—there are no compensation in a near future; !sum[0]—there are surplus remaining bits; pos_sum>=5—if the remaining bits are enough to make one bit; pos_sum >=4 && pos_sum2 >=5 && !rm_s14[0] && !rm_s14_d[0]—if short accumulation is big enough to make one bit; v9 && pos_sum >=4−v9 and v9 event happens with 4+ remaining bits. If this happens, surplus bits may be used to make one bit of output without waiting v11 happens in a future. Similar logic is also used to remove redundant OSDs.

Figure 18:
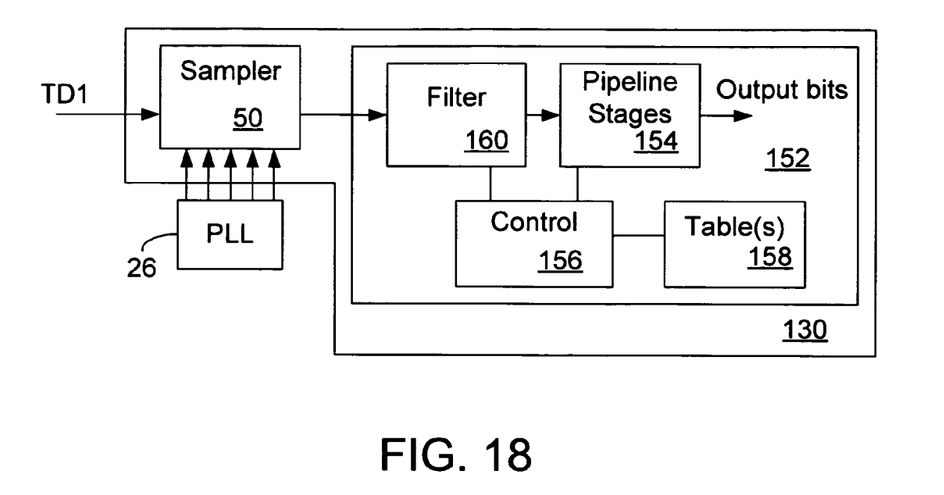
FIG. 18 is a block diagram representation of an example of the receiver of FIG. 1 according to some embodiments of the inventions.

The receiver may use a filter layer as a preprocessor. It filters out single one/zero and also enhances double 1/0's, i.e., 101 becomes 111, 001100 becomes 011110, etc. This layer is useful for a very dirty low quality input stream since single 1/0 and/or narrow 1/0's may cause a confusion in the decision procedure. It may also mimic what we are doing for the dirty input stream. For example, FIG. 18 illustrates such a preprocessor filter 160 which prefilters samples for pipeline stages 154 in a processing circuitry 130 under the control of control circuitry 156. Table(s) 158 may be used.

Figure 19:
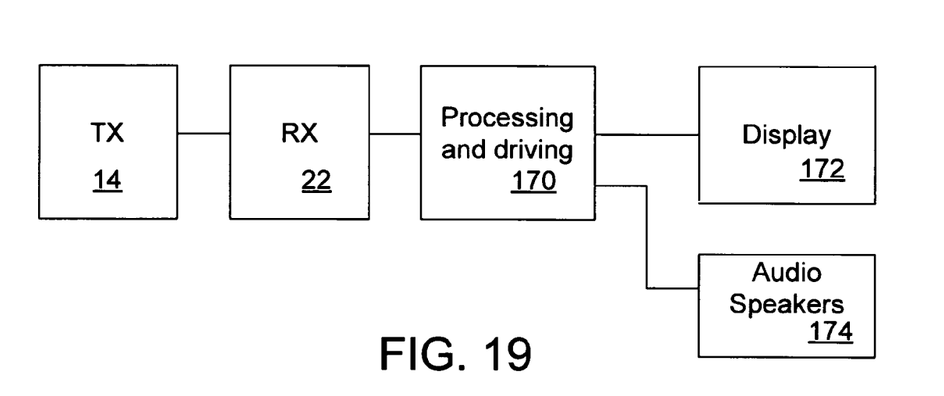
FIG. 19 is a block diagram representation of a system according to some embodiments of the inventions.

FIG. 19 illustrates a system in which the receiver of the invention may be positioned. Referring to FIG. 19, transmitters 14 provide video signals, audio signals, and other signals to receivers 22. Receivers 22 provide the signals to processing and driving circuitry 170, which in turn provide video signals to a display 172 and audio speakers 174. The video signals may be DVI compliant or non-DVI compliant. In some implementations, the receivers allow handling of large and fast jitter for coherent transmitters and non-coherent receivers.

Note that in some cases, it is not clear what value the UI represents. In such a case, the receiver may request that a portion of the transmitted signal be resent.

The inventions are not restricted to any particular type of signaling. The input and clock signals can be single ended or differential. The clocks may include "eyes." The clocking can be single data rate, double data rate, quad data rate, etc. In double data rate, a rising falling edge of a single clock signal may be used, or two out of phase clocks may be used. The signals may be packetized or non-packetized. Depending on the embodiment, the data signals TD1 . . . TDN of FIG. 1 may include various types of data including address, command, and traditional data, or merely traditional data.

This disclosures includes various figures that are schematic in nature and do not include various details. In actual implementations, the systems and chips would include additional components that are not illustrated including between circuitry illustrated in the figures. The illustrated components may have various additional inputs and outputs. Various algorithms and methods described herein may be performed in hardware circuitry without or without the assistance of firmware or software. However, firmware and/or software may be used in overall systems in which the algorithms and methods are performed.

As used herein, the term "embodiment" refers to an implementation. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. Different references to "some embodiments" do not necessarily refer to the same "some embodiments."

If the specification states a component, feature, structure, or characteristic "may", "might", or "could" be included, that particular component, feature, structure, or characteristic is not required to be included. If the specification or claim refers to "a" structure, that does not mean there is only one of the structure.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A chip comprising:
    sampling circuitry to produce oversampled data from a received signal; and
    logic to determine which of the oversampled data are to be part of different unit intervals, wherein some of the unit intervals have a number of oversampled data that is different than a number of oversampled data typically included in the unit intervals.

2. The chip of claim 1, wherein for at least some of the determinations, the logic evaluates a section of oversampled data and looks ahead by also evaluating additional oversampled data occurring after the section in time order.

3. The chip of claim 2, wherein the oversampled data are arranged in lines and for some of the determinations, the section is in one of the lines and the additional oversampled data is in another of the lines.

4. The chip of claim 2, wherein the logic includes stages in a pipeline and wherein the oversampled data are arranged in lines that are advanced through the stages and wherein the logic concurrently evaluates different sections of the oversampled data in different lines.

5. The chip of claim 4, wherein for at least some of the determinations, the logic evaluates a section of oversampled data and looks ahead by also evaluating additional oversampled data occurring after the section in time order.

6. The chip of claim 5, wherein for some of the determinations, the section is a last group of the oversampled data of its line, and the additional oversampled data is a first group of the oversampled data of the next line in time order.

7. The chip of claim 4, wherein the lines of oversampled data are held in the stages in an order based on when the oversampled data is created so that the first line to be created is the first to pass through the pipeline.

8. The chip of claim 4, wherein at least one section of a line being evaluated in a particular stage is identified within the stage by a pointer, and wherein as a line advances in the pipeline, the pointer moves toward an end of the line by an amount equal to the number of oversampled data that were found by the previous stage to be included in a unit interval.

9. The chip of claim 4, wherein some of the stages later in the pipeline have a smaller capacity than some of the stages earlier in the pipeline.

10. The chip of claim 4, wherein the oversampled data being evaluated in line shifts its relative position within a stage as the line advances through at least some of the stages.

11. The chip of claim 4, wherein the logic further determines values of output bits based on content of the unit intervals, and wherein each line typically provides a particular number of bits as it passes through all the stages, and if lines provide more than the particular number of bits a certain number of times, then that fact is considered in determinations for future lines until a future line provides less than the particular number of bits, and if a line provides less than the particular number of bits a certain number of times, then that fact is considered in determinations for future lines until a future line provides more than the particular number of bits.

12. The chip of claim 4, wherein the lines have 50 oversampled data, there are typically 5 oversampled data per unit interval, and on average there are 10 output bits in the 50 oversampled data.

13. The chip of claim 4, wherein the logic uses tables to help with the determinations.

14. The chip of claim 4, wherein logic includes prefiltering to alter the values of some of the oversampled data prior to the determinations.

15. A method comprising:
sampling a received signal to produce oversampled data; and
determining which of the oversampled data are to be part of different unit intervals, wherein some of the unit intervals have a number of oversampled data that is different than a number of oversampled data typically included in the unit intervals.

16. The method of claim 15, wherein for at least some of the determinations, the logic evaluates a section of oversampled data and looks ahead by also evaluating additional oversampled data occurring after the section in time order.

17. The method of claim 16, wherein the oversampled data are arranged in lines and for some of the determinations, the section is in one of the lines and the additional oversampled data is in another of the lines.

18. The method of claim 15, wherein the logic includes stages in a pipeline and wherein the oversampled data are arranged in lines that are advanced through the stages and wherein the logic concurrently evaluates different sections of the oversampled data in different lines.

19. The method of claim 15, wherein for at least some of the determinations, the logic evaluates a section of oversampled data and looks ahead by also evaluating additional oversampled data occurring after the section in time order.

20. The method of claim 19, wherein for some of the determinations, the section is a last group of the oversampled data of its line, and the additional oversampled data is a first group of the oversampled data of the next line in time order.

21. A system comprising:
conductors;
a first chip include transmitters to transmit data to the conductors; and
a second chip to receive the transmitted data from the conductors, the second chip having processing circuitry including:
sampling circuitry to produce oversampled data from a received signal; and
logic to determine which of the oversampled data are to be part of different unit intervals, wherein some of the unit intervals have a number of oversampled data that is different than a number of oversampled data typically included in the unit intervals.

22. The system of claim 21, wherein for at least some of the determinations, the logic evaluates a section of oversampled data having the typical number of oversampled data and looks ahead by also evaluating additional oversampled data occurring after the section in time order.

23. The system of claim 22, wherein the oversampled data are arranged in lines and for some of the determinations, the section is in one of the lines and the additional oversampled data is in another of the lines.

24. The system of claim 22, wherein the logic includes stages in a pipeline and wherein the oversampled data are arranged in lines that are advanced through the stages and wherein the logic concurrently evaluates different sections of the oversampled data in different lines.

25. The system of claim 24, wherein for at least some of the determinations, the logic evaluates a section of oversampled data having the typical number of oversampled data and looks ahead by also evaluating additional oversampled data occurring after the section in time order.

26. The system of claim 25, wherein for some of the determinations, the section is a last group of the oversampled data of its line, and the additional oversampled data is a first group of the oversampled data of the next line in time order.

27. The system of claim 21, wherein the processing circuitry further determines values of output bits based on content of the unit intervals and provides output signals responsive thereto, and wherein the system further comprises a display that receives at least some of the output signals.

* * * * *